United States Patent
Bauer et al.

(10) Patent No.: US 6,931,961 B2
(45) Date of Patent: Aug. 23, 2005

(54) GATE CHANGE UNIT FOR AN AUTOMATIC GEARBOX

(75) Inventors: Guenter Bauer, Sulzbach-Rosenberg (DE); Thomas Schober, Hahnbach (DE)

(73) Assignee: Cherry GmbH, Auerbach (DE)

(*) Notice: Subject to any disclaimer, the term of this patent is extended or adjusted under 35 U.S.C. 154(b) by 63 days.

(21) Appl. No.: 10/107,878

(22) Filed: Mar. 20, 2002

(65) Prior Publication Data

US 2002/0134186 A1 Sep. 26, 2002

(30) Foreign Application Priority Data

Mar. 20, 2001 (DE) .......................................... 101 13 534

(51) Int. Cl.$^7$ .......................... F16H 59/00; B60K 17/04; H01H 9/06
(52) U.S. Cl. ................... 74/473.12; 74/335; 74/473.18; 200/61.88
(58) Field of Search ............................. 74/335, 473.12, 74/473.18; 200/61.88

(56) References Cited

U.S. PATENT DOCUMENTS

| | | | | |
|---|---|---|---|---|
| 5,370,015 A | * | 12/1994 | Moscatelli | 74/335 |
| 5,442,974 A | * | 8/1995 | Sugimoto et al. | 74/335 |
| 5,679,937 A | * | 10/1997 | Iwata | 200/61.88 |
| 5,973,593 A | * | 10/1999 | Botella | 200/61.88 |
| 6,098,483 A | * | 8/2000 | Syamoto et al. | 74/473.18 |
| 6,155,128 A | * | 12/2000 | Ersoy et al. | 74/473.12 |

FOREIGN PATENT DOCUMENTS

| | | |
|---|---|---|
| DE | 40 39 842 | 1/1992 |
| DE | 43 34 912 | 2/1995 |
| DE | 196 10 766 | 9/1997 |
| DE | 196 50 154 | 6/1998 |
| DE | 696 02 980 | 12/1999 |
| DE | 198 32 086 | 1/2000 |
| DE | 198 51 211 | 5/2000 |
| EP | 0807 771 | 11/1997 |
| WO | 99/02897 | 1/1999 |

* cited by examiner

Primary Examiner—Thomas R. Hannon
Assistant Examiner—Colby Hansen
(74) Attorney, Agent, or Firm—Jordan and Hamburg LLP

(57) ABSTRACT

A gate change unit for generating gate-changing signals for an automatic gearbox comprises a cover, a gate which is located in the cover and which permits displacement movements and/or pivoting movements in a longitudinal direction and a transverse direction in the plane of the gate change unit, a gear change lever which is guided in the gate and can be displaced and/or pivoted in the longitudinal direction and/or the transverse direction, a housing or carrier part which is connected to the cover, and electrical switch elements, the electrical switch elements generating electrical gear change signals in accordance with the displacement of the gear change lever, which signals are used to control the automatic gearbox. The electrical switch elements are arranged directly on a conductive element, in the form of a printed circuit board or a conductive foil, which is connected to the housing or to the carrier part.

13 Claims, 16 Drawing Sheets

GATE CHANGE UNIT FOR AN AUTOMATIC GEARBOX

DESCRIPTION

The present invention relates to a gate change unit for generating control signals, in particular a gate change unit for generating gear change signals for an automatic gearbox.

Different changing units for generating control signals for an automatic gearbox by means of a gear change lever or selector shaft or triggering lever are known from the prior art. The respective gear change units are aimed at performing different technical tasks.

The publication DE 40 39 842 C1 discloses, for example, a gear change unit which is suitable for precisely sensing the position of the gear change lever. This object is achieved according to DE 40 39 842 C1 in that a potentiometer is used to sense the position of the gear change lever, the potentiometer being combined with a momentary-contact switch which is activated by a latching disc which is connected to the gear change lever. It is claimed that a particularly compact embodiment of this invention will be obtained if the potentiometer is arranged directly on the latching disc.

A significant disadvantage of the gear change unit according to DE 40 39 842 C1 is that the gear change lever is moved only unidimensionally or in a pivotable fashion about the selector shaft. Here, the number of control functions which can be carried out with the gear change lever is significantly lower than in the case of a lever which can be moved two-dimensionally. Furthermore, the manufacture of the gear change unit which is described in DE 40 39 842 C1 also requires a large degree of expenditure on labour and material resources. The reason for this is not only the relatively complicated embodiment of the mechanical part of the gear change unit but also the necessity for complex cabling of switches to elements of the evaluation electronics which are intended for evaluating the signals generated in the gear change unit.

A further gear change unit for generating control signals for an automatic gearbox is disclosed in the publication EP 0 807 771 A1. A disadvantage of this gear change unit is that the sensing of the position of the triggering lever and the triggering of a corresponding control signal is carried out using a slider contact arrangement which is accommodated in the housing of the gear change unit, contact being made with the slider contacts in accordance with switching over of the position of the trigger lever. This embodiment of the gear change unit according to EP 0 807 771 A1 leads to improved tolerance in the sensing of the position of the trigger lever and leads to measurements in what are referred to as transition regions being avoided. However, the gear change unit disclosed in EP 0 807 771 A1 also has disadvantages. A significant disadvantage of the gear change unit is that the gear change lever moves only unidimensionally, specifically in a pivotable fashion about the selector shaft. As a result, the number of control functions which can be carried out with a gear change lever or trigger lever is significantly smaller than in the case of a gear change lever which can be moved two-dimensionally. Furthermore, the manufacture of the gear change unit described in EP 0 807 771 A1 also requires a large degree of expenditure.

The publication DE 196 10 766 A1 discloses a gate change unit which eliminates some of the significant disadvantages of the abovementioned gear change units. This is achieved in that the gate change unit according to DE 196 10 766 A1 has a manual gear change lever which can be moved in a T-shaped gate in a longitudinal direction and in a transverse direction in relation to the gate change unit. The gate change unit disclosed in DE 196 10 766 A1 thus provides the possibility of not only creating the gear change lever positions (P, R, N and D) which are customary for automatic gearboxes but also additional positions (for example D+ and D−) and of introducing an additional function of the forward gear changing operation which provides manual sense-feedback.

A significant disadvantage of this gate change unit is the complex configuration of the mechanical switch part and the necessity for cabling of the switch elements of the gate change unit to elements of the evaluation electronics for the purpose of evaluating the signals which are generated. A significant disadvantage of the gate change unit which is disclosed in DE 196 10 766 A1 is that the additional functions above and beyond the customary functions (corresponding to the gear change lever positions P, R, N and D) which are customary for automatic gearboxes are restricted only to the function of manual changing of the forward gears (corresponding to the gear change lever positions D+ and D−).

The object of the present invention is thus to provide a gear change unit with a compact design which, despite the small space requirement, permits reliable sensing of the position of the gear change lever contained in the gear change unit.

The object of the present invention is also to propose a gear change unit which avoids the necessity for complex cabling of switch elements of the gear change unit to elements of the evaluation electronics and thus permits simple mounting of the gear change unit. An object of the present invention is also to propose a gear change unit which permits a series of additional gear change functions above and beyond the customary gear change options (for example P, R, N, D gear change options). A further object of the present invention is to propose a gear change unit for an automatic gearbox which has gate change symbolic elements, these gate change symbolic elements serving to unambiguously indicate a position assumed by the gear change lever. Finally, an object of the present invention is to propose a gear change unit which can be operated with sense-feedback.

The abovementioned objects (advantages) are achieved according to the invention using a gate change unit which has electrical switch elements such as slider tracks and slider contacts arranged directly on a printed circuit board.

More specifically, according to the invention, a gate change unit for generating gear change signals for an automatic gearbox comprises a cover of the gate change unit, a gate which is located in the cover and which permits displacement movements and/or pivoting movements in a longitudinal direction and a transverse direction in the plane of the gate change unit, a gear change lever which is guided in the gate and can be displaced and/or pivoted in the longitudinal direction and in the transverse direction, a housing or carrier part which is connected to the cover and electrical switch elements (for example slider tracks and slider contacts or microswitches), the electrical switch elements generating electrical gear change signals in accordance with the displacement or other movement of the gear change lever, which signals are used to control the automatic gearbox. The particular feature of the gate change unit according to the invention is that the electrical switch elements are arranged directly on a conductive element, in the form of a printed circuit board or a conductive foil, which is connected to the housing or to the carrier part.

The essence of the present invention can be clarified by means of the example of two preferred embodiments of the gate change unit according to the invention.

The preferred embodiments are illustrated in more detail in the following description and the associated drawings, FIGS. 1 to 10 relating to the first embodiment and FIGS. 11 to 16 relating to the second embodiment of the gate change unit according to the invention.

Figure 5:
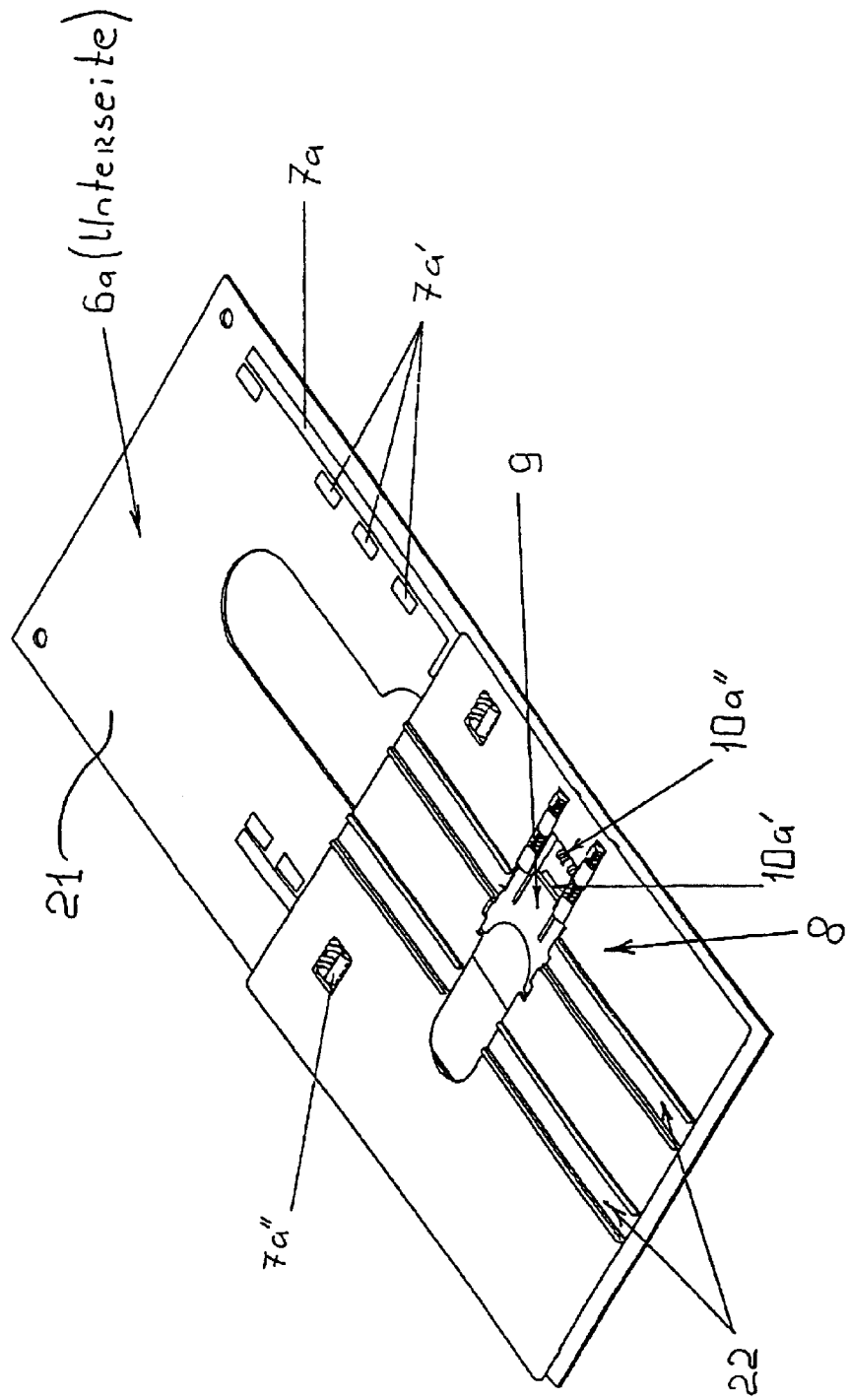
Figure 6:
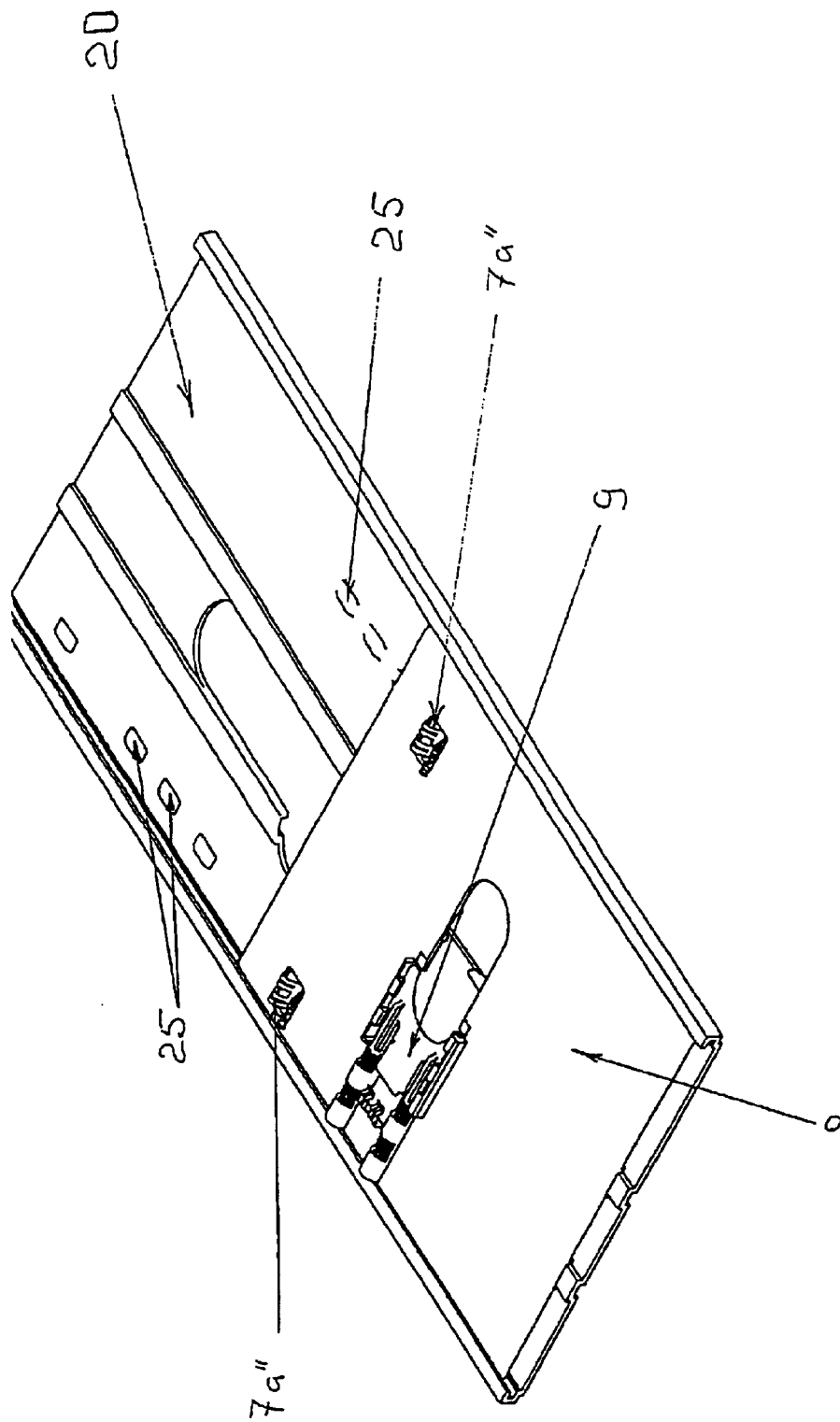
Figure 7:
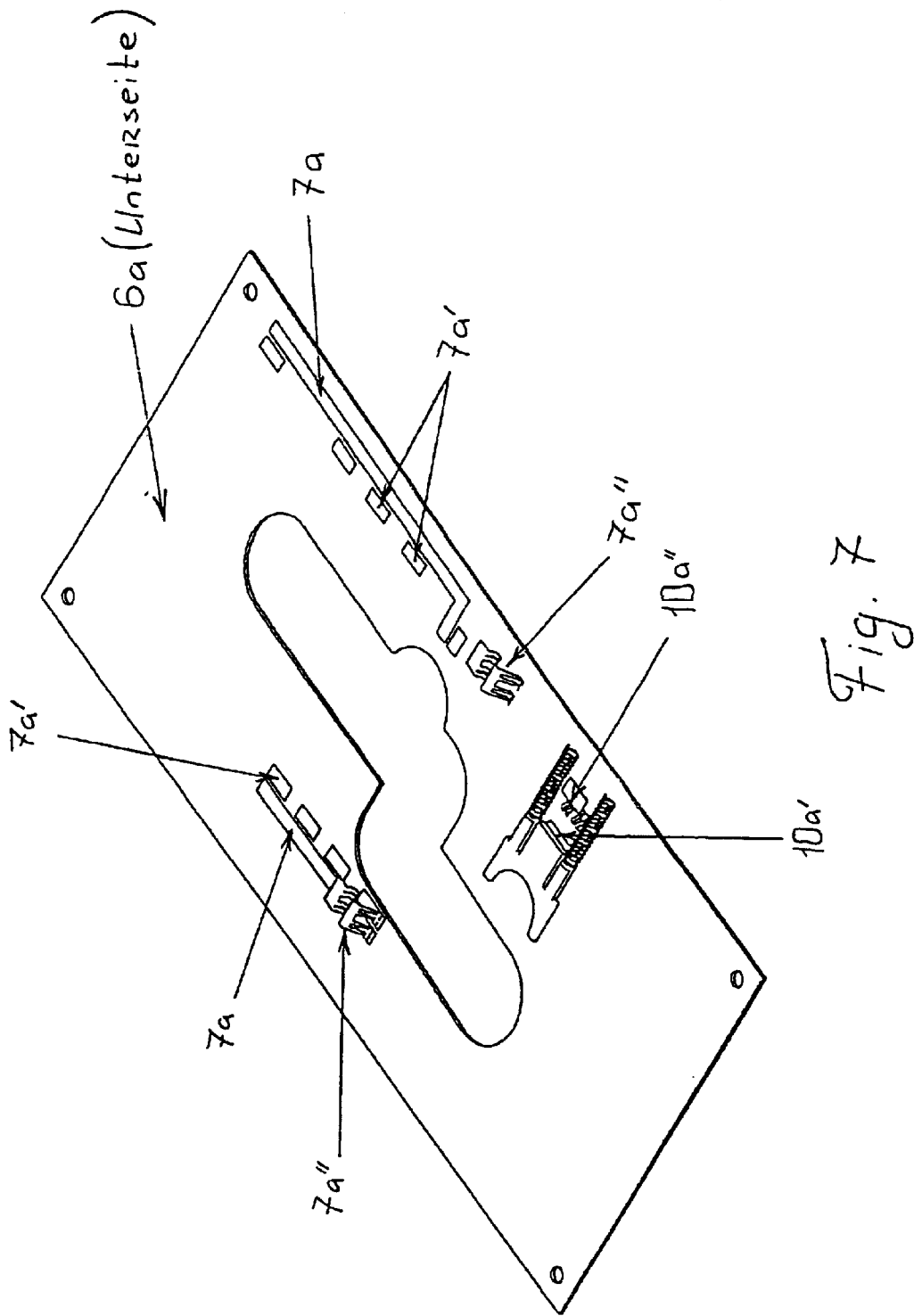
Figure 8:
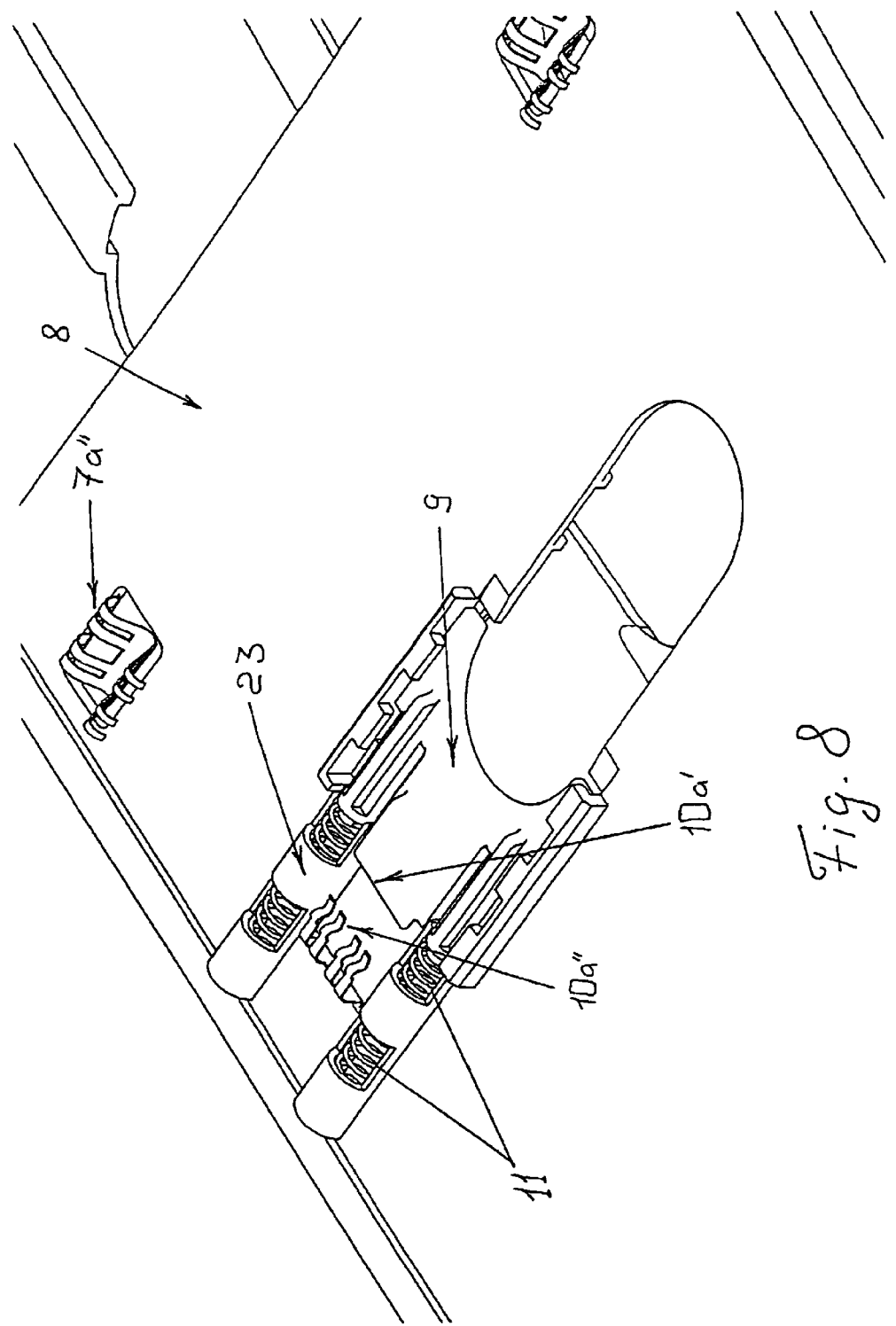
Figure 9:
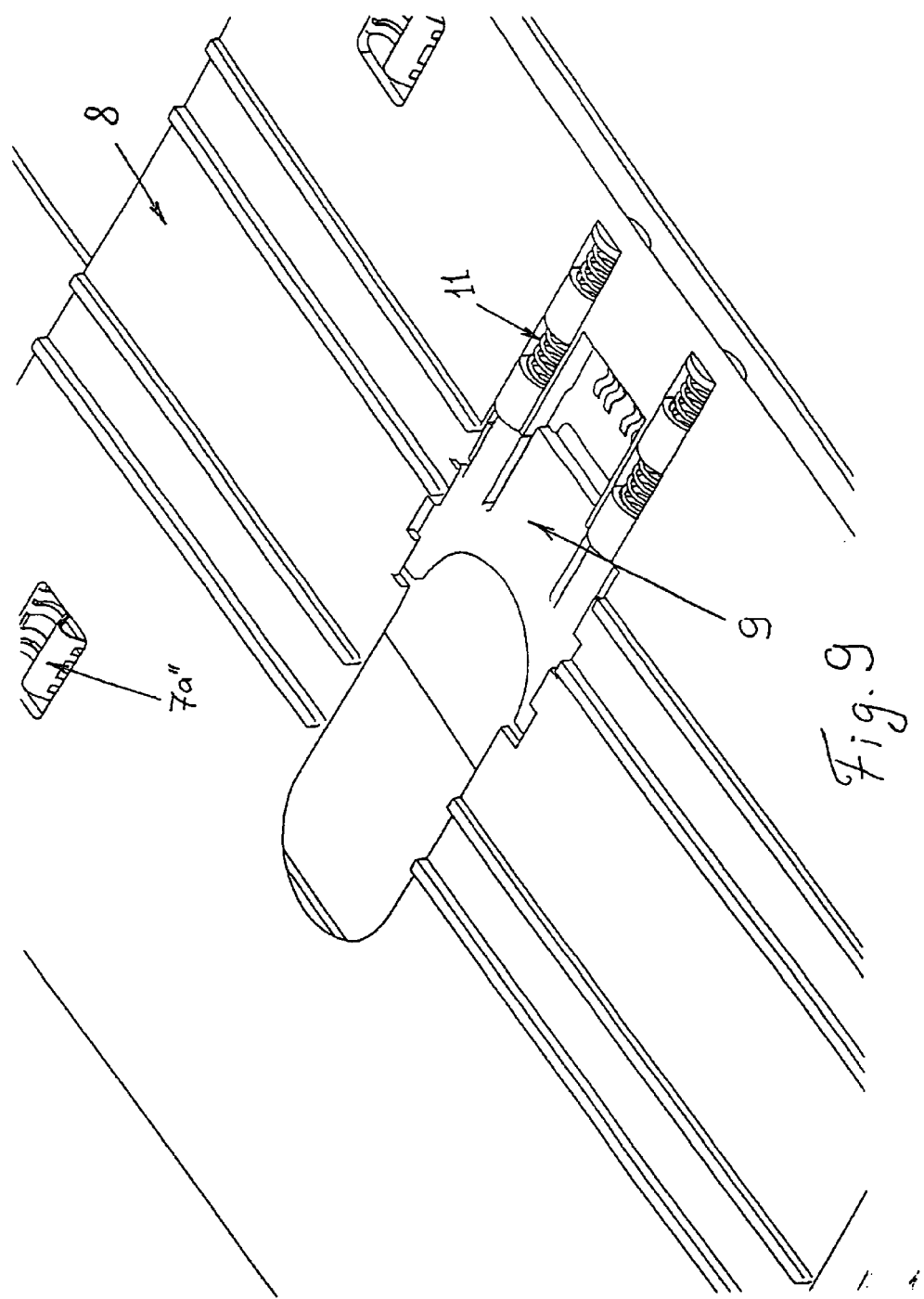
Figure 10:
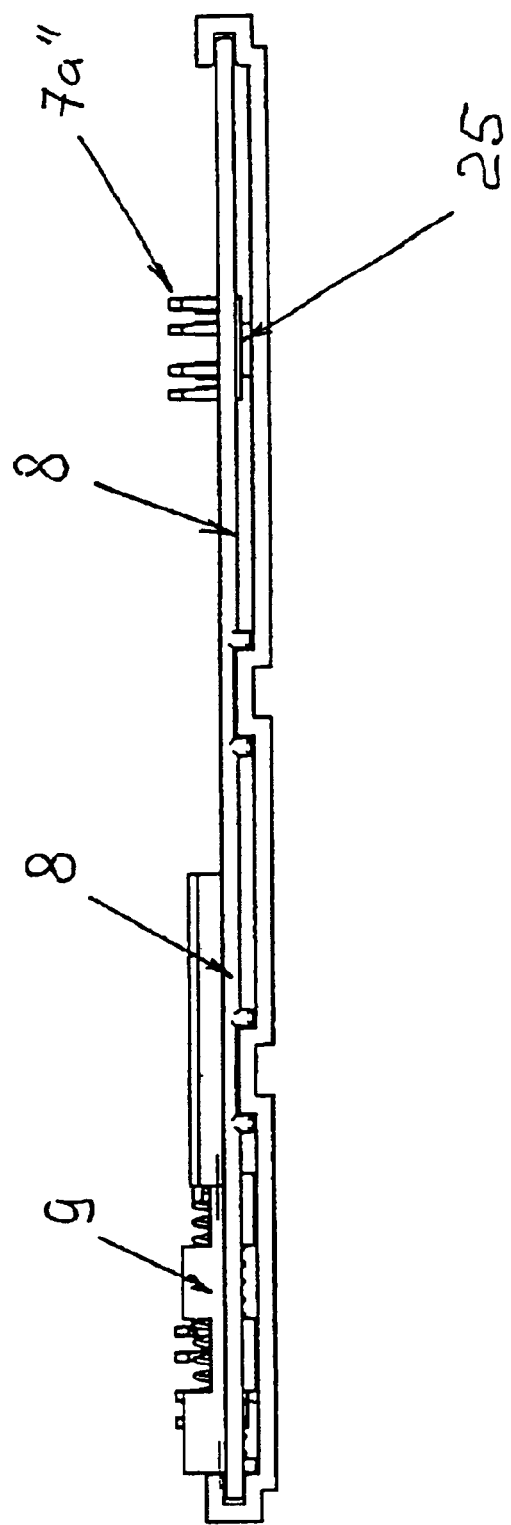
Figure 11:
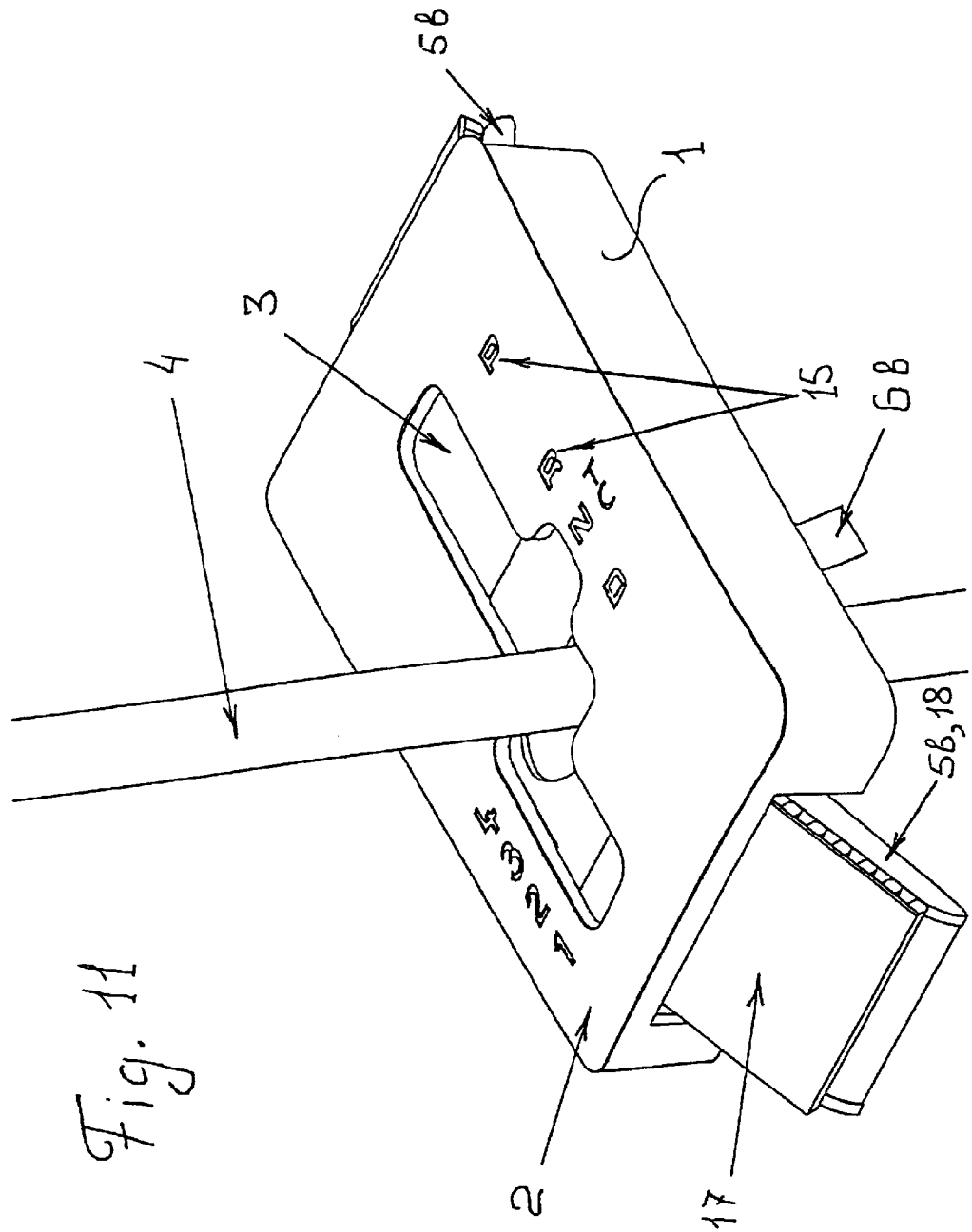
Figure 12:
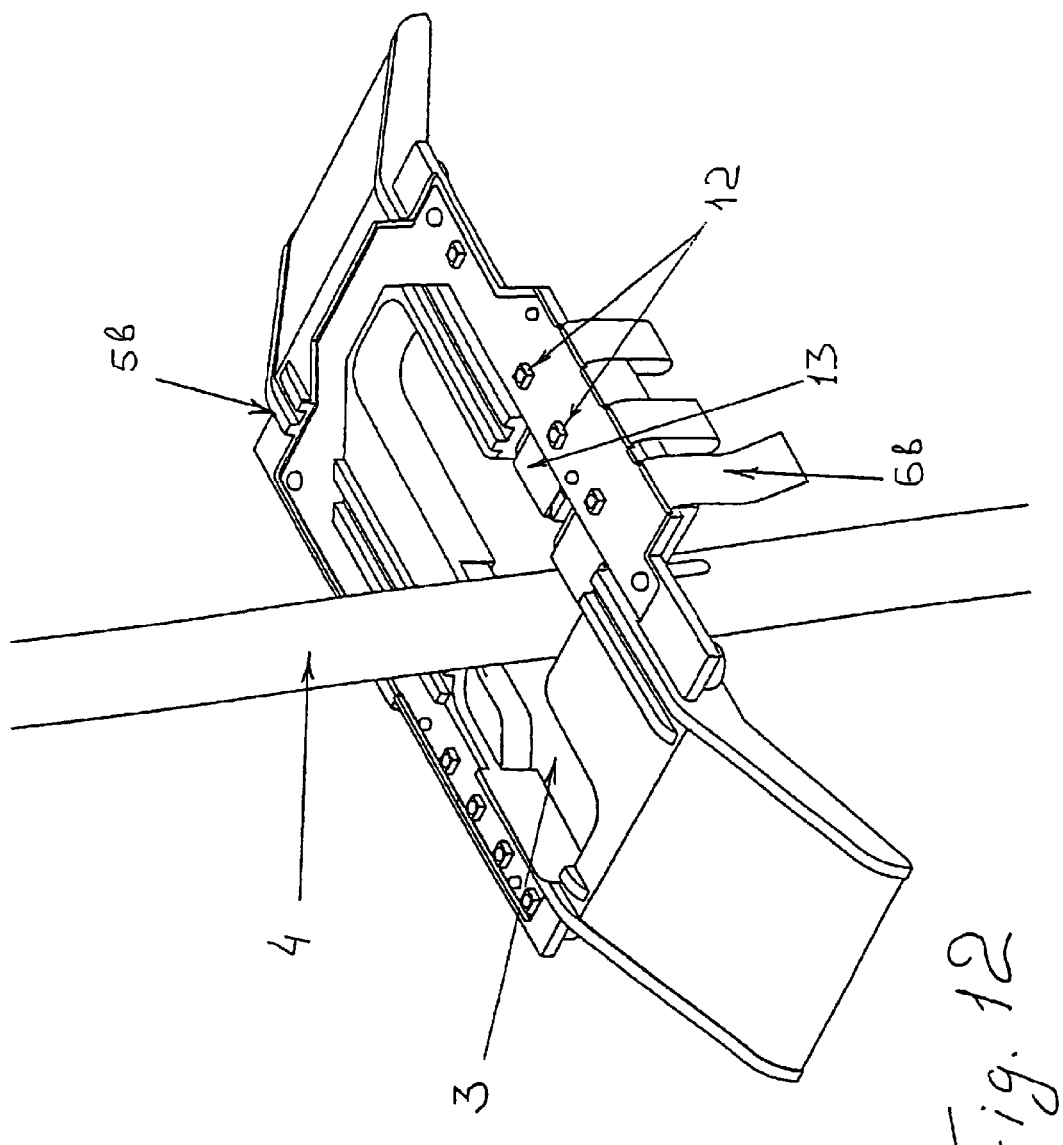
Figure 13:
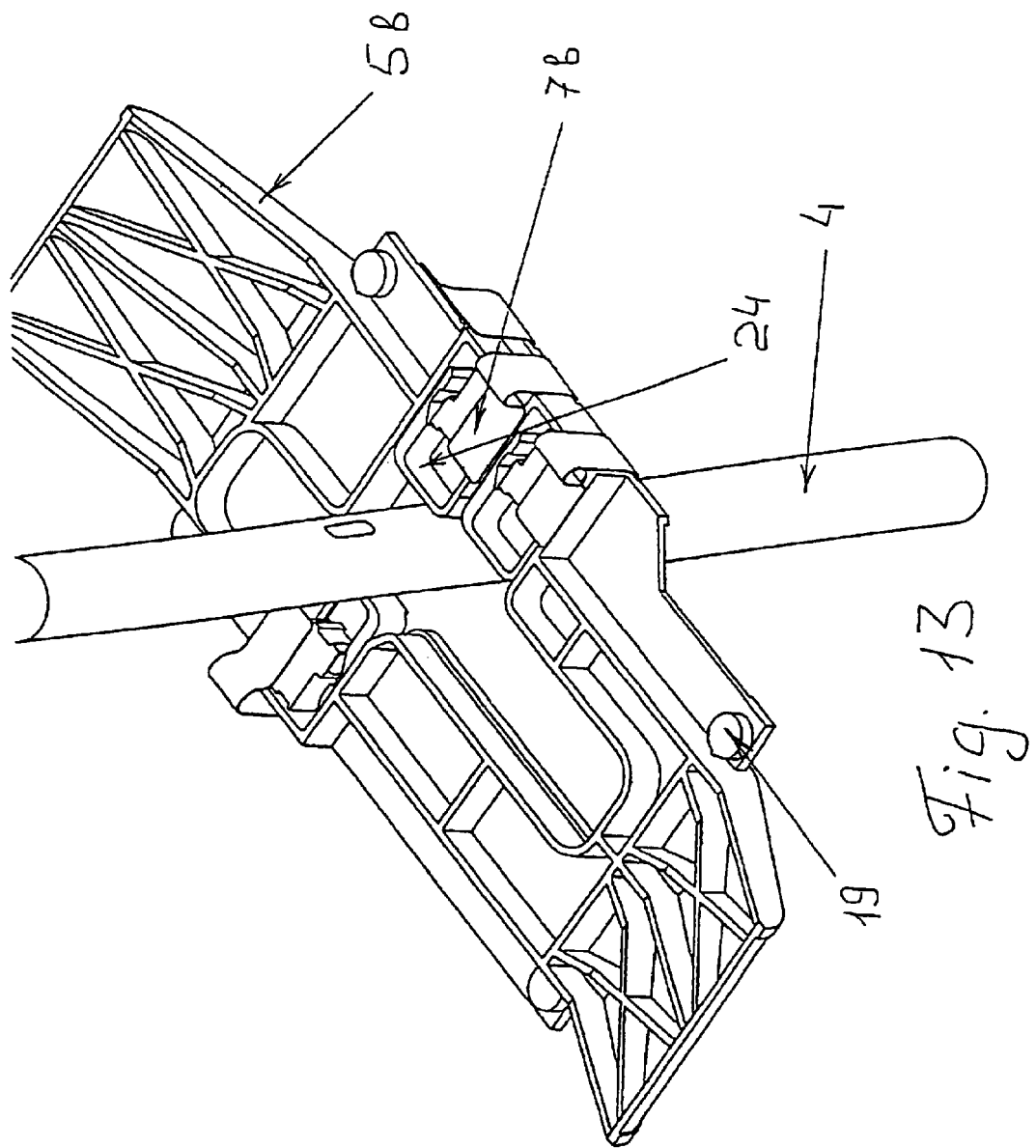
Figure 14:
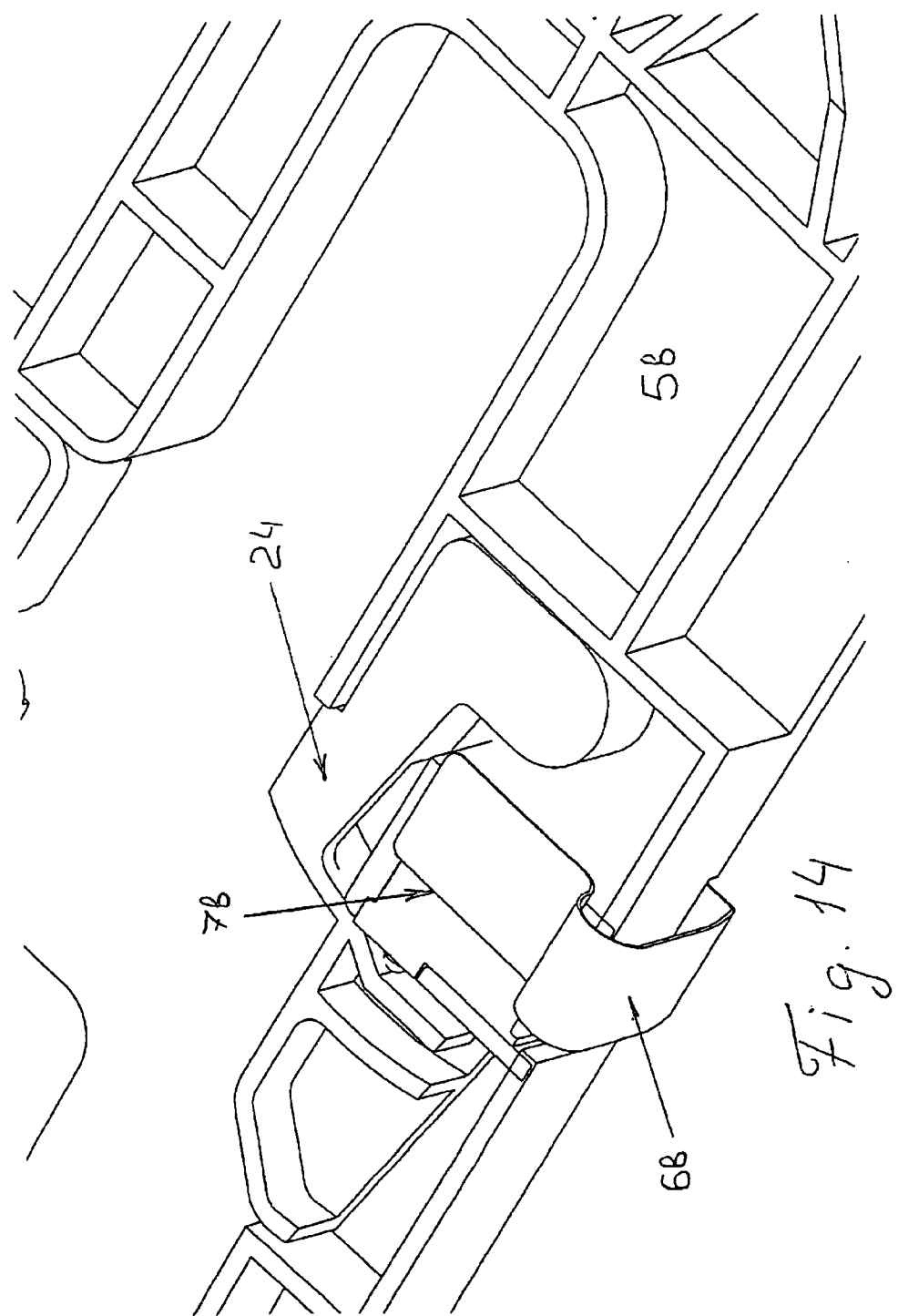
Figure 15:
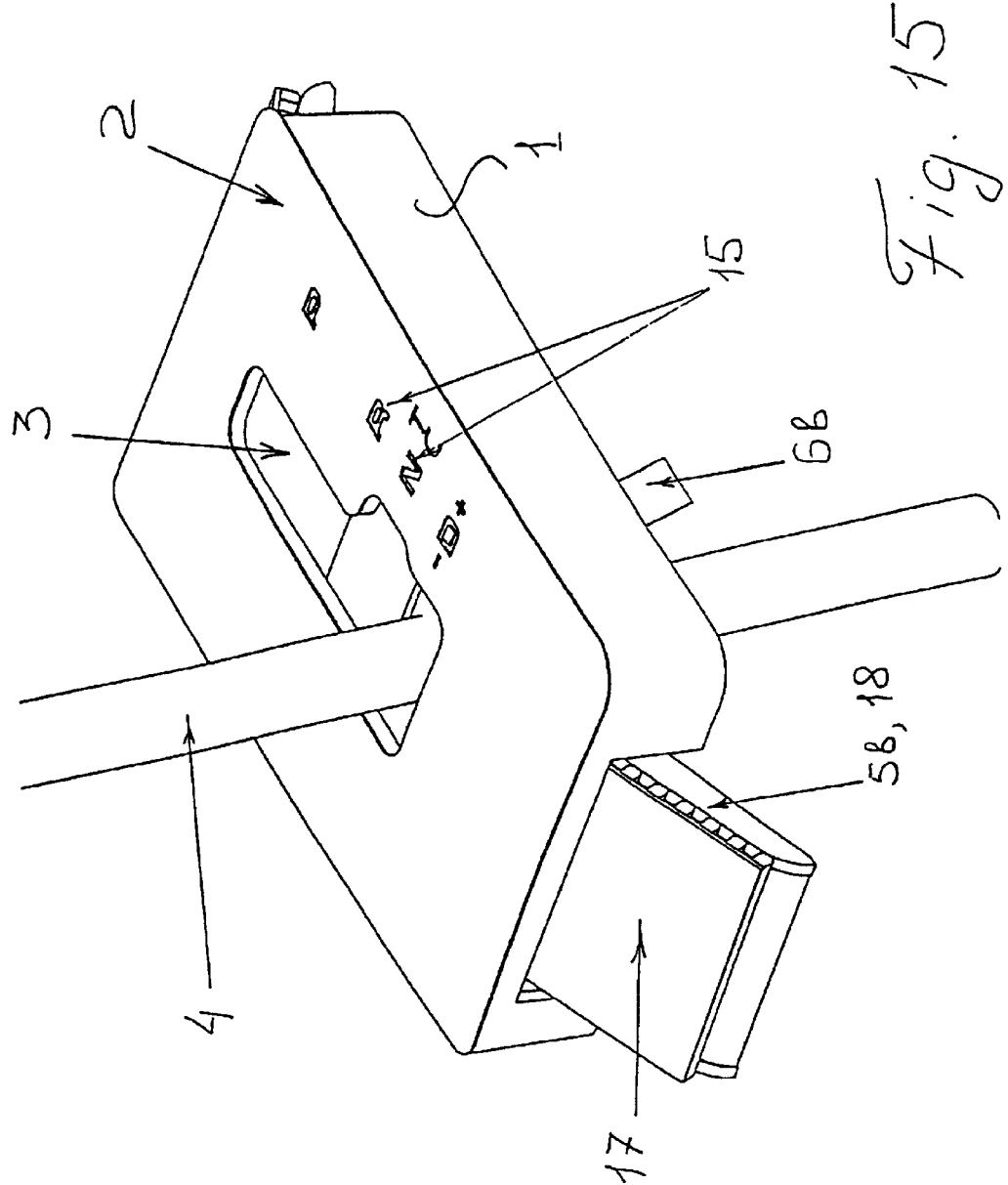
Figure 16:
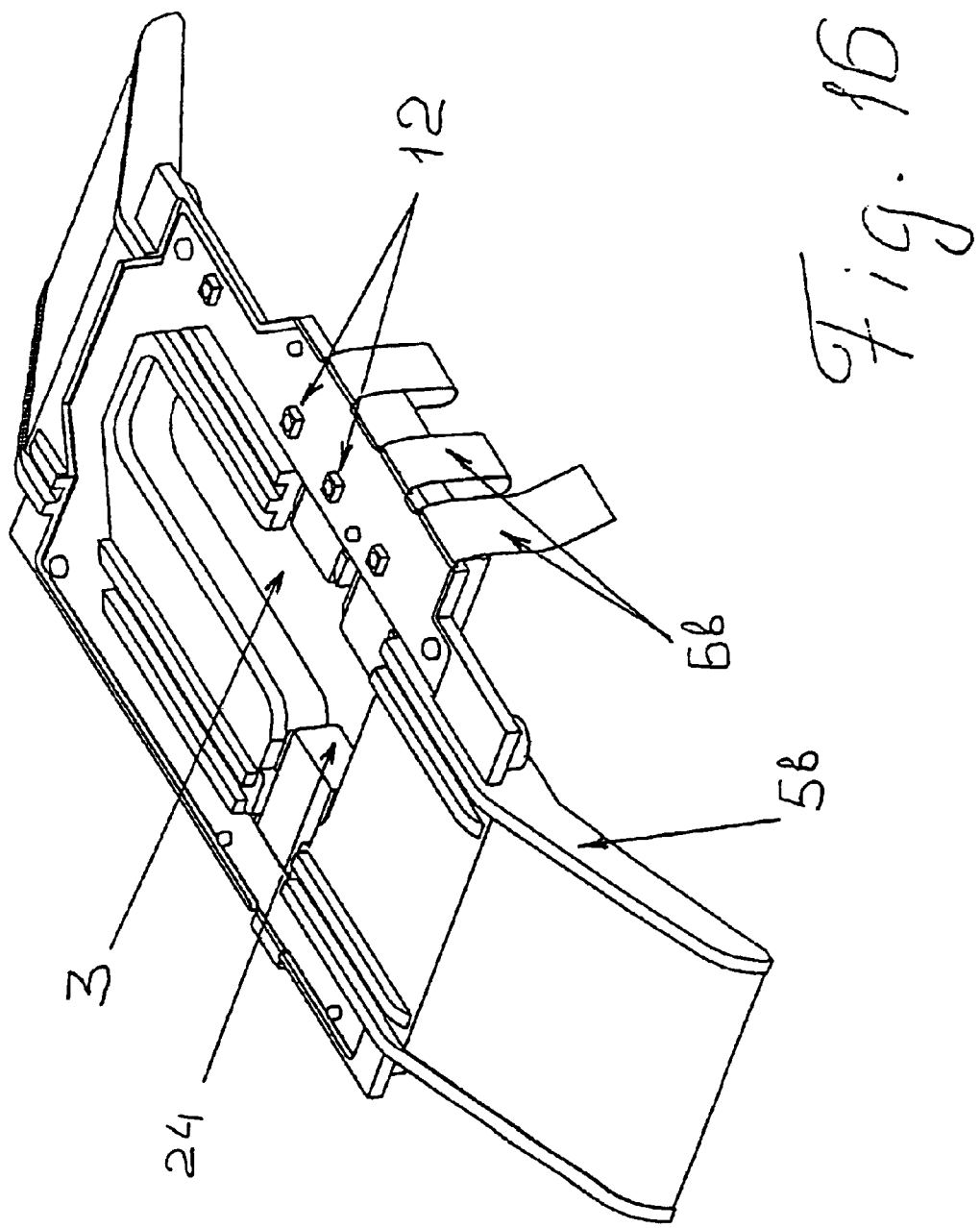

FIG. 5 is a view from below of the printed circuit board with a slide plate which lies on the printed circuit board and has a transverse slide, FIG. 6 is a plan view of the base part with the slide part (with the transverse slide) mounted on the base part, FIG. 7 is a view from below of the printed circuit board with electrical switch elements, FIG. 8 is a plan view of the transverse slide, FIG. 9 is a view from below of the transverse slide, FIG. 10 is a cross section of the base part with the slide plate and the transverse slide mounted on the base part, FIG. 11 is a general view of a second embodiment of the gate change unit according to the invention, FIG. 12 is the second gate change unit without cover, gear change lever or shutter, FIG. 13 is a view from below of a carrier part with a gear change lever located in the carrier part, FIG. 14 is an enlarged view of a switch element, FIG. 15 is a general view of a further example of the second embodiment of the gate change unit according to the invention, and FIG. 16 is a carrier part for the second embodiment.

Figure 1:
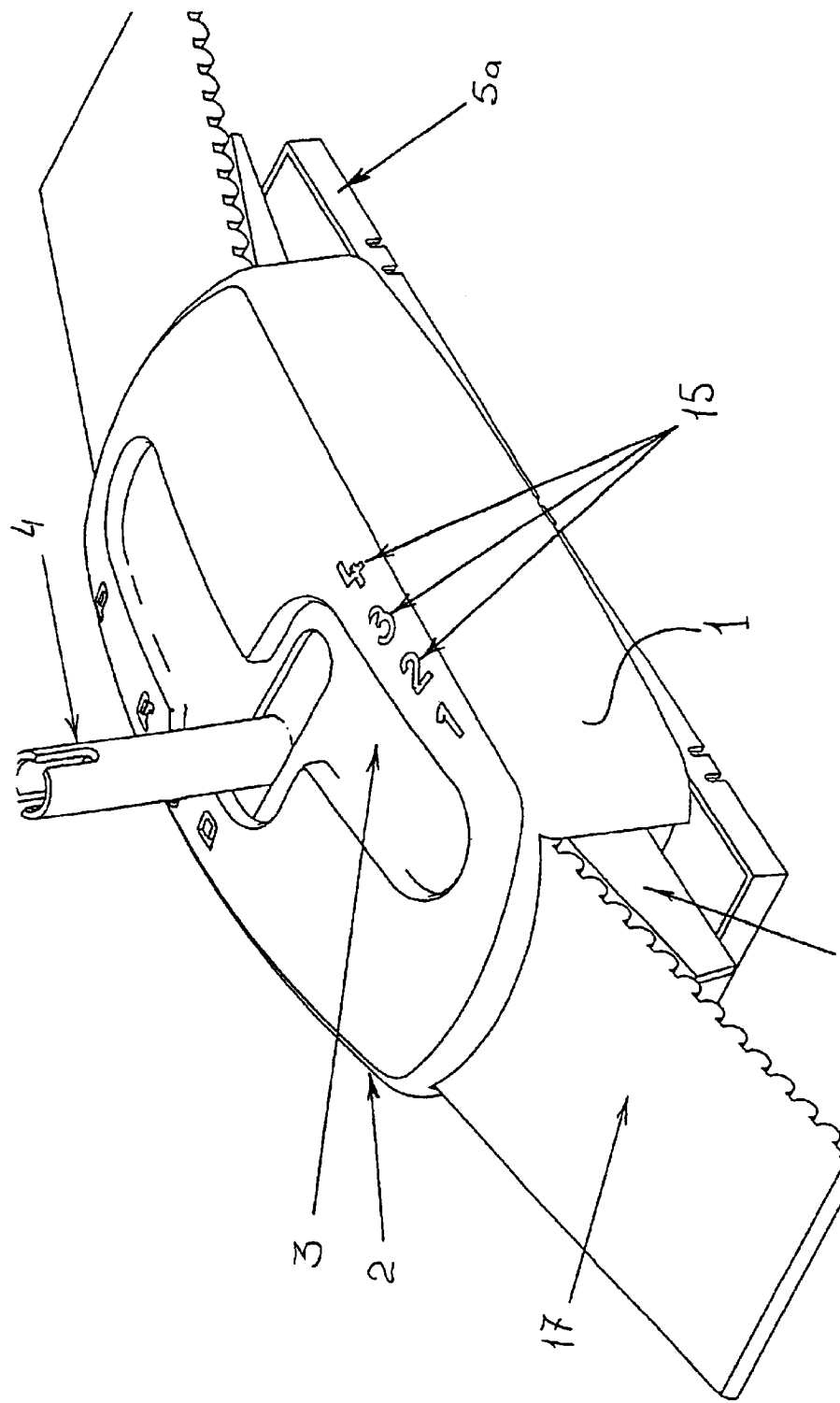
FIG. 1 is a general view of a gate change unit according to the invention.

FIG. 1 shows a general view of a gate change unit (1) according to the invention. The gate change unit (1) comprises a cover (2), a gear change lever (4) guided in a gate (3), and a housing (5a). According to the invention, the gate (3) allows the displacement movements and/or pivoting movements in a longitudinal direction and a transverse direction in the plane of the gate change unit (1).

The gate change unit (1) can also comprise a shutter (17) which is guided under the cover (2) on a shutter guide (18), the shutter (17) serving predominantly to protect the parts of the gate change unit (1) located under the cover (2) against dirt or dust and/or water droplets. The cover (2) of the gate change unit (1) can also have a series of gate change symbolic elements (15), the gate change symbolic elements (15) serving to indicate a position assumed by the gear change lever (4).

The gate change unit (1) according to the invention functions in the following way: electrical switch elements (not shown in FIG. 1) are activated as a result of displacement movements and/or pivoting movements of the gear change lever (4), the electrical switch elements generating electrical gear change signals in accordance with the displacement of the gear change lever (4), which signals are used to control the automatic gearbox. From FIG. 1 it is apparent that the gear change lever (4) can be displaced and/or pivoted in the gate (3) in a longitudinal direction and a transverse direction in the plane of the gate change unit (1). This relatively extensive freedom of movement of the gear change lever (4), which is made possible according to the invention by a specific configuration of gear change techniques (not shown in FIG. 1) [lacuna] for the gate change unit (1) to carry out not only the customary gear change functions (for example P, R, N, D gear change options) but also a series of additional gear change functions (for example options for a "Tiptronic" gear change or option for step-down gearing for off-road vehicles). Furthermore, it must be particularly emphasized that the present invention permits various forms of gate, it being possible to adapt the forms of gate to the various types of vehicle.

Figure 2:
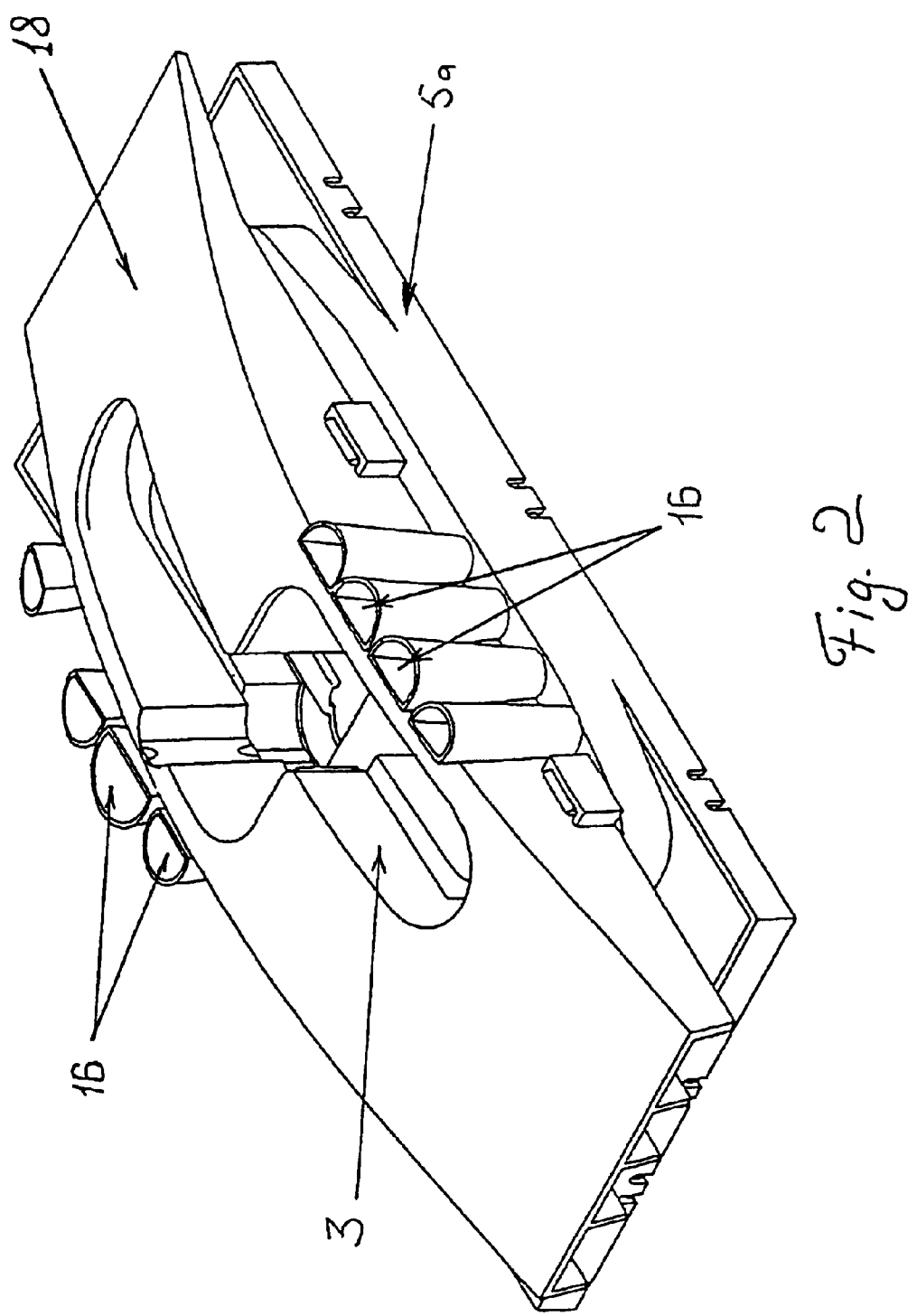
FIG. 2 is a gate change unit without cover, gear change lever or shutter.
Figure 3:
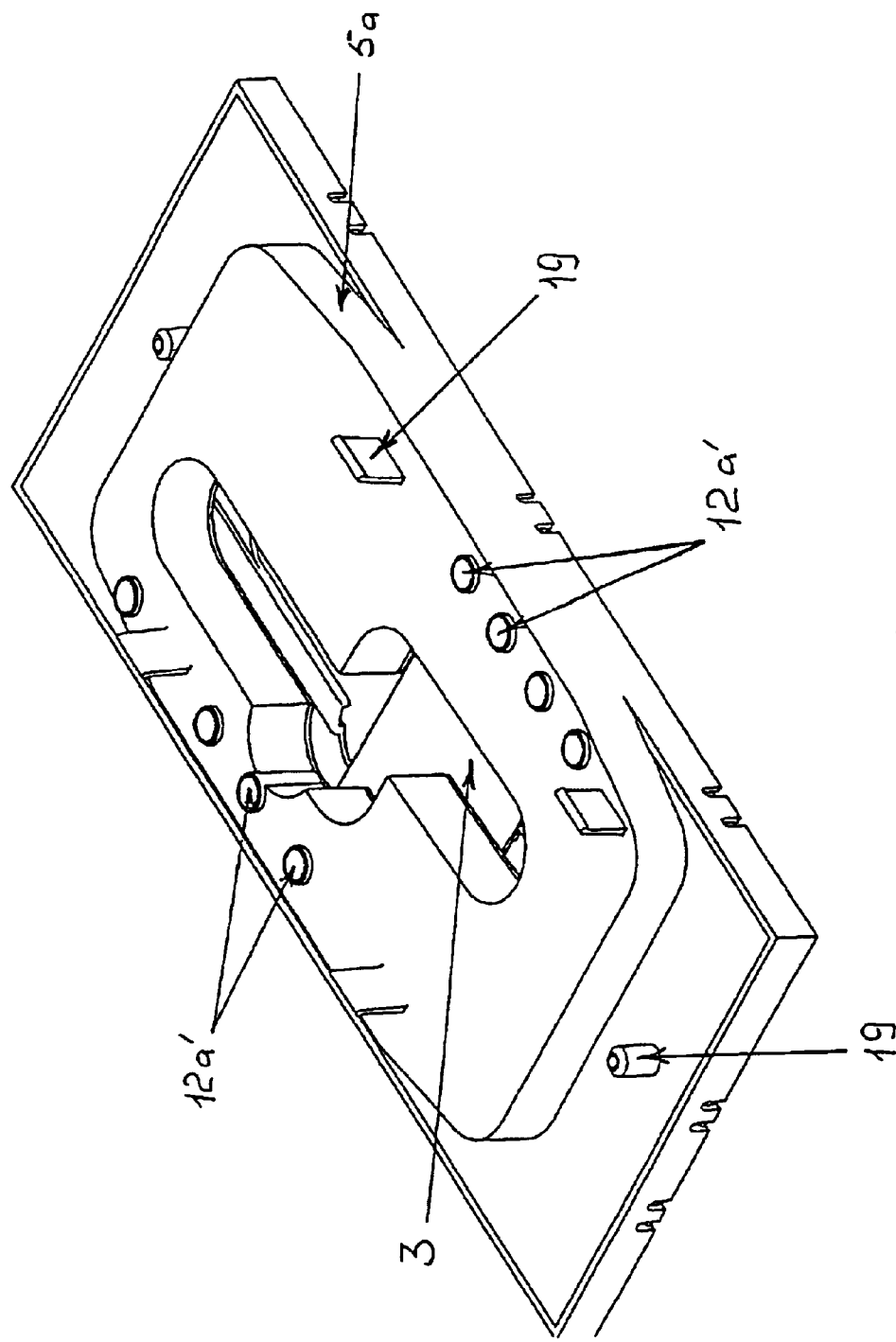
FIG. 3 is a plan view of the housing of the gate change unit.

FIG. 2 shows the gate change unit (1) according to the invention without cover (2), gear change lever (4) and shutter (17). FIG. 2 shows that the shutter guide (18) has of its sides a series of light shafts (16) which serve to let through the light generated by light-emitting diodes (LEDs 12) shown in FIG. 4, in order to illuminate the gate change symbolic elements (15), each light-emitting diode (LED 12) being assigned to a specific light shaft. In contrast to conventional lighting techniques, which are used in gear change units which are currently available on the market, the light from the LEDs (12) is not guided by means of plastic lightguides, which are usually relatively complicated and fragile, but instead directly via cylindrical lightguides (12a') which are shown in FIG. 3 and via the light shafts (16) to the gate change symbolic elements (15). Such a configuration of the gate change unit (1) according to the invention not only ensures the manufacturing costs for manufacture (for example owing to simplicity during mounting) of the gear change unit to be reduced but also the reliability in the function of the gear change unit to be guaranteed.

FIG. 3 shows a plan view of the housing (5a) of the gate change unit (1). The housing (5a) also has a series of mounting elements (19) which ensure relatively simple mounting of the gate change unit (1) according to the invention.

Figure 4:
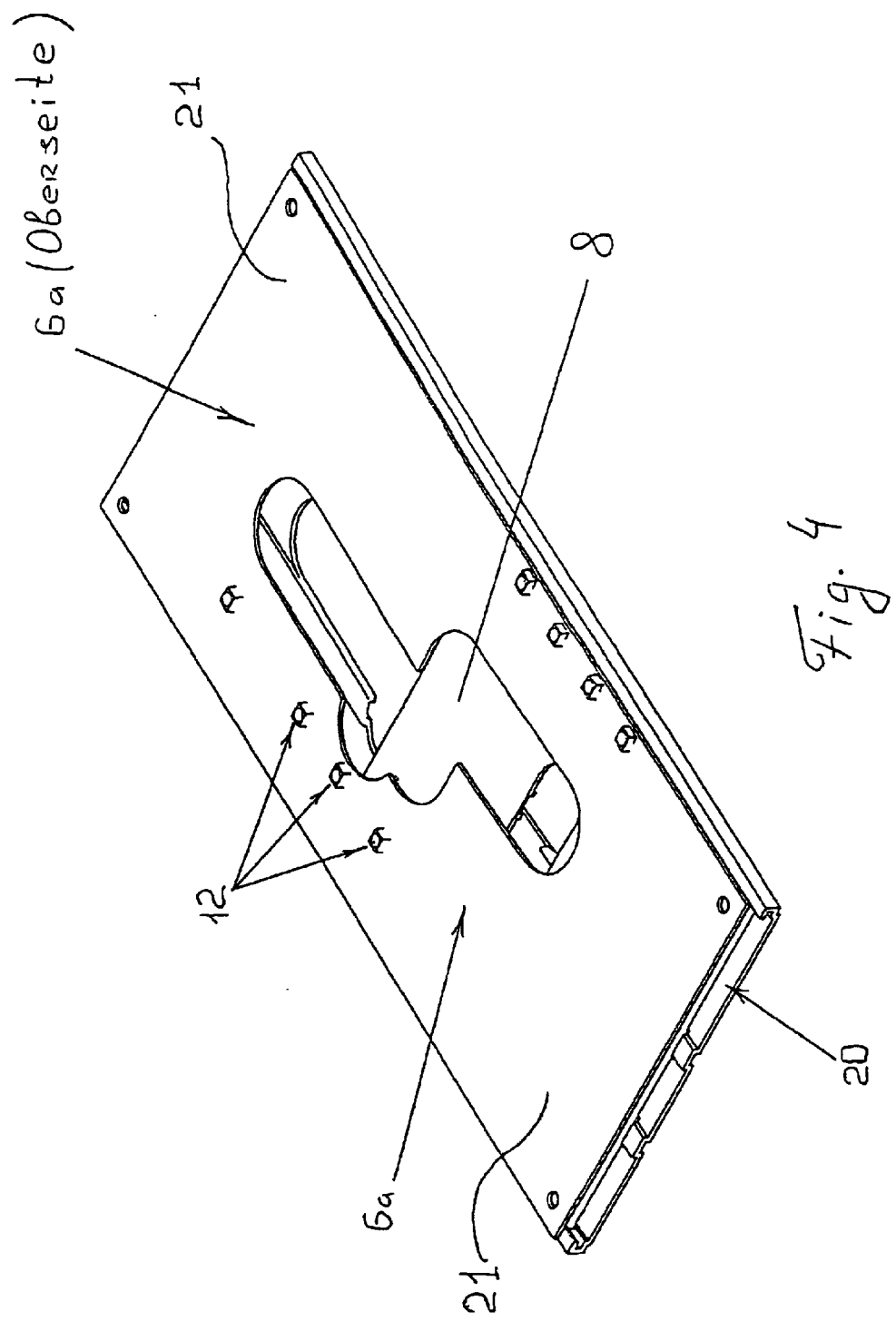
FIG. 4 is a plan view of the printed circuit board.

FIGS. 4, 5 and 6 show an important inventive aspect of the present invention. According to the invention, gear change signals which correspond to the movements of the gear change lever (4) in the gate (3) of the gate change unit (1) are generated using an arrangement which is illustrated in more detail in FIGS. 4 to 6. This arrangement comprises a printed circuit board (6a), a slide plate (8) with a transverse slide (9) positioned on the slide plate (8), and a base part (20). The printed circuit board (8) has a series of slider contacts (7a') and one or more slider tracks (7a) which are preferably mounted on the lower side of the printed circuit board (6a). The printed circuit board (6a) also has a series of light-emitting diodes (LEDs 12) which are preferably connected by forming electrical contact between the slider track (7a) and one of the slider contacts (7a') which are connected to the LED (12). The formation of the electrical contacts between the slider track (7a) and the electrical contacts (7a') is carried out by means of one or more sliders (7a") which are arranged on the slide plate (8). By moving the slide plate (8) in the direction along the printed circuit board (6a), the movement being determined by the longitudinal guides (22) accommodated on the slide plate (8), the slider (7a") is also moved along the printed circuit board (6a), the slider (7a") being correspondingly placed in contact with different slider contacts (7a') and correspondingly generating electrical signals on these slider contacts (7a'). The electrical signals which are generated on the slider contact (7a') are passed on for evaluation to the passive electrical elements of the evaluation electronics, these elements being preferably also capable of being mounted on the underside of the printed circuit board (for example in regions (21)), with the result that the necessity of a complex cabling between the gear change units and the evaluation electronics is dispensed with. As a result, it is possible to ensure not only the simplicity of mounting but also the compactness and the reliability of the functioning of the gate change unit (1).

In order to provide the possibility of using the movements of the gear change unit (4) in the transverse direction of the printed circuit board (6a) for generating control signals, a transverse slide (9), which can be displaced in the transverse direction of the printed circuit board (6a), is provided on the slide plate (8). The transverse slide (9) has an activation projection (10a') which makes electrical contact with switching segments (10a") when the transverse slide is displaced in the transverse direction by a movement of the gear change lever (4). As a result of the activation projection (10a') being placed in contact with the switching segments (10a"), electrical signals are generated which correspond to the transverse movement of the gear change lever (4) and are passed on for further evaluation to the evaluation electronics of the gate change unit. The transverse slide (9) moves in the transverse slide guides (23) shown in FIG. 8, one or more shift-back spring devices (11) in the transverse slide guides ensuring that when the gear change lever (4) is released it returns to its original position.

FIGS. 9 and 10 together with a list of the reference symbols which clarify the designations introduced in the figures are included as a further aid for understanding the first exemplary embodiment of the gate change device (1) according to the invention.

A further preferred exemplary embodiment of the gate change unit according to the invention is shown in FIGS. 11 to 16.

FIG. 11 is a general view of a second embodiment of the gate change unit (1) according to the invention, which has essentially identical features to the preferred embodiment shown in FIG. 1.

A significant difference of the gate change unit (1) shown in FIG. 11 is that the conductive element is not in the form of a printed circuit board (6a) but rather in the form of a conductive film (6b), the conductive film (6b) being composed of conductive tracks which are applied to a film carrier or integrated into the film carrier.

A further difference of the second embodiment is that the electrical switch elements are not in the form of slider contacts (7a, 7a', 7a") but rather in the form of microswitches (7b). The microswitches (7b) are applied to the conductive film (6b), the microswitches (7b) being secured in their specific position on the conductive film (6b) by clipping them in or by means of some other suitable attachment method.

The common feature between the two embodiments in FIG. 1 and FIG. 11 is that the electrical switch elements (7a, 7a' or 7b) are each arranged directly on the conductive element, that is to say on the conductive film (6b) or on the printed circuit board (6a), as a result of which the objects on which the invention is based (avoidance of complex cabling, compactness of the gate change unit, simple mounting, etc.) are achieved.

Slide elements (24) (which are suitably shaped) are installed in front of the microswitches (7b) in rails and/or guides which are integrated on the [lacuna] in carrier part (5b). The structure and the position of the slide elements (24) is selected such that the microswitches (7b) remain unactivated in the position of rest of the gear change lever (4).

When the gear change lever (4) is deflected in the direction of a microswitch (7b), the slide element (24) is also moved along. The microswitch (7b) is activated by means of the inner contour of the slide element (24) and passes on a signal to the evaluation electronics of the gate change unit (1). The resetting of the gear change lever (4) and of the slide element (24) takes place by means of a spring with which noises (rattling in the position of rest) caused by the gear change are also avoided.

Further details of the configuration of the gate change unit (1) according to the second exemplary embodiment can be found in FIGS. 11 to 16, reference being again made to the list of reference symbols and parts with comparable functions having identical reference numerals.

LIST OF REFERENCE SYMBOLS

1. Gate change unit
2. Cover
3. Gate (cut-outs in the cover etc.)
4. Gear change lever
5a. Housing
5b. Carrier part
6a. Printed circuit board
6b. Conductive film
7a. Slider tracks
7a'. Slider contacts
7a". Slider
7b. Microswitch
8. Slide plate
9. Transverse slide
10a'. Activation projection
10a". Switching segment
10a'., 10a". Electrical switching elements which are activated by the transverse slide
11. Shift-back spring device
12. Light-emitting diodes (LEDs)
12a'. Cylindrical lightguides
13. Slide element
14. Guides and/or rails
15. Gate change symbolic elements
16. Light shaft
17. Shutter
18. Shutter guide
19. Mounting elements
20. Base part
21. Regions of the printed circuit board (6a) to be equipped with passive electronic elements of an evaluation electronic system
22. Longitudinal guides
23. Transverse slide guides
24. Slide element
25. Embossing on the base part (20)

What is claimed is:

1. A gate change unit for generating gear change signals for an automatic gearbox in response to movement of a gear change lever, comprising:
   a base member having a base member opening for accepting the gear change lever therethrough and having longitudinal guides on opposing sides;
   a printed circuit board mounted on said base member and having a planar configuration, said printed circuit board including:
   a circuit board opening for accepting the gear change lever therethrough;

at least one slider conductor track and a plurality of slider conductor contacts printed on a bottom side of said circuit board for generating electrical gear change signals used to control the automatic gearbox in accordance with the displacement of the gear change lever, said at least one slider conductor track and said plurality of slider conductor contacts facing in a downward direction; and an electronic component mounting region on the bottom side on which are mounted electronic elements for evaluating electrical signals generated by said at least one slider conductor track and said plurality of slider conductor contacts;

a longitudinal slide plate displaceably mounted in said longitudinal guides to move under and relative to said printed circuit board, said longitudinal slide plate having:

a planar configuration;

an opening for engaging said gear change lever such that longitudinal movement of said gear change lever effects longitudinal movement of said longitudinal slide plate relative to said printed circuit board; and said longitudinal slide plate having at least one upwardly direct switching contact disposed to selectively electrically interconnect a respective one of said at least one slider conductor track and one of said slider conductor contacts in response to displacement of said slide plate by longitudinal movement of said gear change lever;

a shutter having an opening accepting said gear change lever to permit transverse movement of said gear change lever with respect to said shutter and to permit longitudinal movement of said shutter with movement of said gear change lever;

a housing mounted to said base member, said housing including a housing opening for accepting and guiding the gear change lever;

a shutter guide on an upper portion of said housing for guiding movement of said shutter in the longitudinal direction;

a cover mounted on the housing and having a cover opening accepting said gear change lever to permit transverse and longitudinal movement of said gear change lever, said cover displaying gear-changing gate symbols; and said shutter guide being disposed below said cover and above said housing, said printed circuit board, and said slide plate, said cover providing protection from debris entering through said housing opening into said printed circuit board and said slide plate.

2. The gate change unit of claim 1, further comprising:

said longitudinal slide plate further having transverse switch contact conductor segments;

a transverse slide plate displaceably mounted on said longitudinal slide plate and configured to engage said gear change lever such that transverse movement of said gear change lever effects transverse movement of said transverse slide plate relative to said printed circuit board and said longitudinal slide plate; and said transverse slide plate having an activation projection for selectively engaging said transverse switch contact conductor segments of said longitudinal slide plate, in response to said transverse movement of said transverse slide plate, to generate electrical gear change signals.

3. The gate change unit of claim 2, wherein said transverse slide plate has a shift-back spring device biasing said transverse slide plate into engagement with said gear change lever and biasing said gear change lever to a position of rest.

4. The gate change unit of claim 3, wherein said gear-changing gate symbols serve to display a position assumed by said gear change lever said printed circuit board has light sources on a top surface which illuminate said gear-changing gate symbols.

5. The gate change unit of claim 4, wherein said housing includes light conductive conduits arranged to conduct light from a respective one of said light sources to a respective one of said gear-changing gate symbols.

6. The gate change unit of claim 5, wherein said shutter and said shutter guide are curved in the longitudinal direction.

7. The gate change unit of claim 1, wherein said gear-changing gate symbols serve to display a position assumed by said gear change lever said printed circuit board has light sources on a top surface which illuminate said gear-changing gate symbols.

8. The gate change unit of claim 7, wherein said housing includes light conductive conduits arranged to conduct light from a respective one of said light sources to a respective one of said gear-changing gate symbols.

9. The gate change unit of claim 8, said shutter and said shutter guide are curved in the longitudinal direction.

10. The gate change unit of claim 1, further comprising a transverse slide plate displaceably mounted on said longitudinal slide plate and configured to engage said gear change lever such that transverse movement of said gear change lever effects transverse movement of said transverse slide plate relative to said printed circuit board and said longitudinal slide plate.

11. The gate change unit of claim 10, wherein said transverse slide plate has a shift-back spring device biasing said transverse slide plate into engagement with said gear change lever and biasing said gear change lever to a position of rest.

12. The gate change unit of claim 11, wherein said shutter and said shutter guide are curved in the longitudinal direction.

13. The gate change unit of claim 1, wherein said shutter and said shutter guide are curved in the longitudinal direction.

* * * * *